United States Patent
Burkhard et al.

[19]

[11] Patent Number: 5,929,329
[45] Date of Patent: Jul. 27, 1999

[54] PROCESS FOR DETERMINING WHEEL SPEED SIGNAL CORRECTION FACTORS

[75] Inventors: Dieter Burkhard, Waldfischbach-Burgalben; Manfred Dornseiff, Bromskirchen; Robert Schmidt, Rennerod; Jean-Claude Schwartz, Frankfurt am Main, all of Germany

[73] Assignee: ITT Manufacturing Enterprises, Inc., Wilmington, Del.

[21] Appl. No.: 08/776,364

[22] PCT Filed: Jul. 6, 1995

[86] PCT No.: PCT/EP95/02630

§ 371 Date: Apr. 28, 1997

§ 102(e) Date: Apr. 28, 1997

[87] PCT Pub. No.: WO96/04158

PCT Pub. Date: Feb. 15, 1996

[30] Foreign Application Priority Data

Jul. 29, 1994 [DE] Germany ............. P44 26 960

[51] Int. Cl.[6] .................................................. E01C 23/00
[52] U.S. Cl. .................................. 73/146; 73/488; 73/1.37
[58] Field of Search ............................. 73/146, 488, 1.37

[56] References Cited

U.S. PATENT DOCUMENTS 5,415,468  5/1995  Latarnik et al. ................. 303/100
5,479,811  1/1996  Baumann et al. ................. 73/1.37

FOREIGN PATENT DOCUMENTS 0508146   10/1992  European Pat. Off. .
WO 8904783  6/1989  WIPO .

OTHER PUBLICATIONS

German Search Report for Application P4426960.9.

English Translation of the International Preliminary Examination Report for PCT/EP95/02630 filed Jul. 6, 1995.

*Primary Examiner*—Max H. Noori
*Attorney, Agent, or Firm*—Rader, Fishman & Grauer PLLC

[57] ABSTRACT

The present invention discloses a method of determining correction factors by which the different tire-tread circumferences are ascertained and compensated, wherein a short-time correction factor ($KZ_{Rn}$) and a long-time correction factor ($LZ_{RN}$) is developed for each wheel, the deviation ($D_{Rn}$) of the short-time correction factor from the long-time correction factor is determined and the deviation is weighted by way of a band-pass filter (3), wherein subsequently a long-time average value ($LM_{Rn}$) of the weighted deviation (D'Rn) is developed, and a partial value ($TW_{Rn}$) of the long-time average value ($LM_{Rn}$) is assessed, as a function of the driving condition, for the correction and adaption of the long-time correction factor ($LZ_{Rn}$).

11 Claims, 1 Drawing Sheet

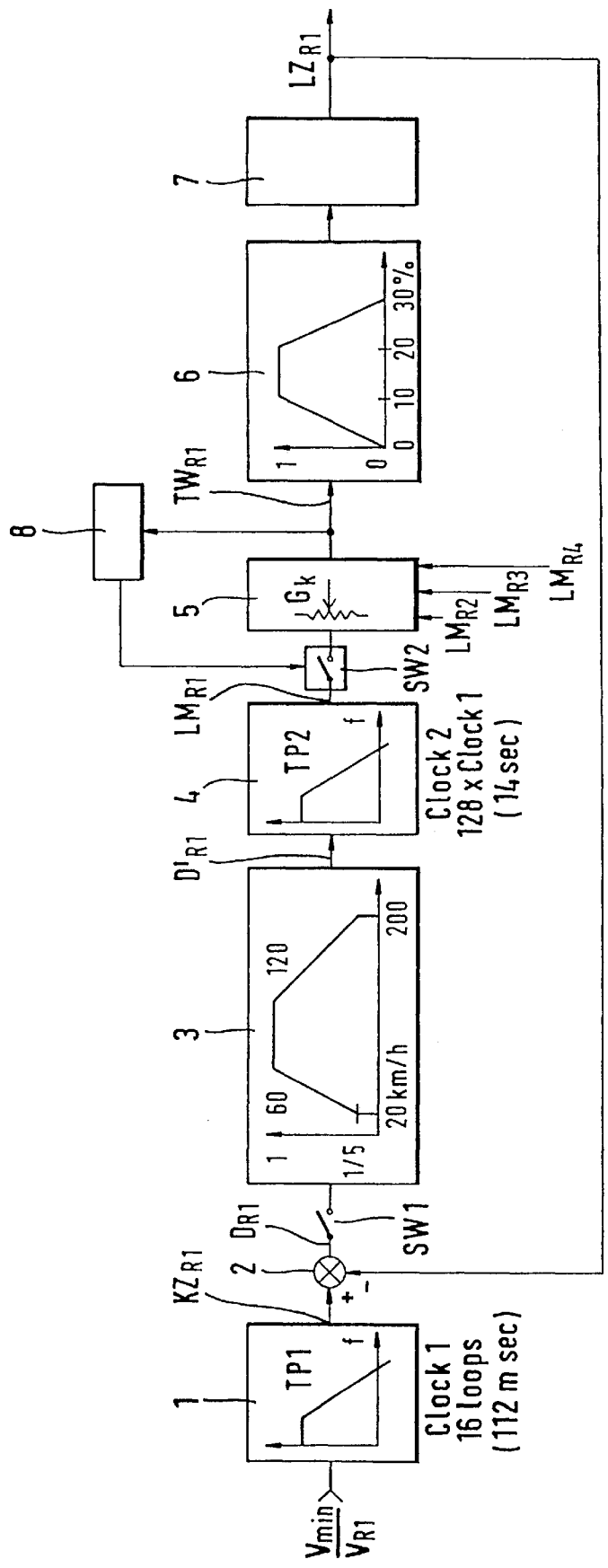

PROCESS FOR DETERMINING WHEEL SPEED SIGNAL CORRECTION FACTORS

The present invention relates to a method of determining correction factors by which the differences of the tire-tread circumferences are ascertained in the evaluation of wheel speed signals, which are input signals for automotive vehicle control systems, wherein, in the absence of control operations, the wheel speeds are measured, a reference speed is determined and the wheel speed is compared to the reference speed for producing the correction factors.

International application WO 89/04783 discloses a process of the above-mentioned type, wherein the wheel speed is measured during wheel slip free periods, correction values are determined from the deviations of the wheels from this vehicle speed and, subsequently, the wheel speed of the individual vehicle wheels is corrected by using the correction values.

All wheels are compared in pairs in this known process. The wheel pair having the lowest speed difference is identified, and the average speed of this wheel pair is assessed as the vehicle speed. An average value of consecutive measurements is then produced. Thereafter, a relation is established between the speed of the individual wheels and the average value to determine the respective correction factor.

Difficulties are involved in thereby achieving the accuracy required for an anti-lock system (ABS) or a traction slip control system (TCS), for example, and in additionally preventing false and misleading correction values due to cornering, or the like.

German patent application No. 39 15 879 discloses a method, wherein a base speed is derived from the speed signals of the individual wheels and a wheel factor or correction factor is developed for each wheel according to a predetermined algorithm. The correction factor multiplied with the actual wheel speed results in the base speed. The wheel speed multiplied with the correction factor, determined this way, is made the basis of further signal processing instead of the actual wheel speed. The method is used to evaluate the wheel speed signals of a brake system with anti-lock or traction slip control.

Further, German patent application No. 40 36 742 discloses a circuitry for a traction slip control system with brake management or engine management which is used to improve the control function when a smaller spare wheel instead of a driven normal wheel is mounted. This circuitry is used to evaluate the rotational speed measured on the spare wheel by a correction factor measured when the wheel rotational behavior is stable. The rotational speed is then conformed to the measured speed value of the second driven wheel of the same axle so that the same slip control threshold applies for the (smaller) spare wheel as for a normal wheel. In this case, the correction factor is also determined during normal travel and when the traction slip control system is not activated.

An object of the present invention is to develop a method which involves a particularly high degree of accuracy of adjustment of the different tire-tread circumferences. The degree of accuracy should even render possible electronic control of brake force distribution on the basis of the wheel speed signals. Compared to an anti-lock system (ABS), the electronic control of brake force distribution necessitates an adjustment of much greater accuracy, i.e. an adjustment ten times more accurate, of the tire-tread circumferences.

It has been found that this object can be achieved by a preferred aspect of the method of the present invention including that a short-time correction factor and a long-time correction factor is developed for each wheel (n), the deviation of the short-time correction factor from the long-time correction factor is determined, this deviation is weighted by way of a band-pass filter which weakens the signals representative of the deviation below a bottom speed threshold and above a top speed threshold, a long-time average value of the weighted deviation is produced by way of a low-pass filter, and a partial value of the long-time average value is assessed, as a function of the driving condition, for the correction or adaption of the long-time correction factor.

Anti-lock control, traction slip control and the electronic control of brake force distribution is achieved by the high-precision correction of the wheel speeds according to the present invention. The variations of the wheel speed signals due to mounting of an emergency wheel, cornering, the influence of engine stall torques, air pressure losses or so-called rough road surfaces are compensated for. The resulting accuracy is appropriate for the electronic control of brake force distribution. A calculation of the transverse acceleration is also possible.

In a preferred aspect of the present invention, the instantaneously lowest wheel speed is taken as the reference speed, and the short-time correction factor of the respective wheel is developed by division of the reference speed by the wheel speed and by producing the average value or filtering the quotient $v_{min}/v_{Rn}$. To produce the average value, appropriately, a digital filter or low-pass filter is used to develop the short-time correction factor according to the relation $$KZ_{Rn} = \frac{1}{N} \sum_{i=1}^{N} \frac{C \times V_{mini}}{V_{Rn\,i}}$$

In the relation, $KZ_{Rn}$ is the average value of the short-time correction factor of the wheel n (n=1 to 4), N is the number of loops or cycles, by way of which the average value is produced, $V_{min}$ is the instantaneously lowest wheel speed, $V_{Rn}$ is the instantaneous speed of the wheel n, C is a constant, for example, C=1000.

With a loop time in the order of 5 to 20 msecs, the average value is developed over a period of time in the order of 50 to 200 msecs according to a preferred aspect of the present invention.

Further, the long-time average values of the weighted deviations in the present invention are produced according to the relation $$LM_{Rn} = \frac{1}{M} \sum_{i=N}^{M \cdot N} f(D'_{Rn})_i$$

In the relation, $LM_{RN}$ is the long-time average value of the wheel n, is the average value of the weighted difference ($D'_{Rn}$) between the short-time correction factor and the long-time correction factor of the wheel n, M is the number of the summing intervals N.

Further, in one embodiment of the method of the present invention, the partial values of the long-time average values are determined by curve-weighting factors which must be determined by a diagonal, sidewise and axlewise comparison of the long-time average values of the individual wheels.

Finally, in another arrangement, the long-time correction factors are varied as a function of the partial values and depending on the magnitude of the partial values.

Further features, advantages and possible applications of the present invention can be seen in the description of one embodiment, making reference to the accompanying drawing which shows, in a symbolical view, the sequence of the method of the present invention, the individual steps and functions.

In this diagram, the input quantity used for each wheel is a quotient $v_{min}/v_{R1}$ which is produced by the instantaneously lowest speed $v_{min}$ and the respective wheel speed $v_{Rn}$, or $V_{R1}$ if wheel No. 1 is concerned.

A short-time correction factor $KZ_{R1}$ is developed from the input quantity $v_{min}/v_{R1}$ by way of a low-pass filter 1. The filter in the present case is a digital filter or digital low-pass filter 1 (TP1) which, in this example, calculates an average value of the input signal $v_{min}/v_{R1}$ across 16 loops at a clock frequency of 7 msecs, i.e., for a duration of 112 msecs. The output signal of the low-pass filter 1, i.e. the short-time correction $KZ_{R1}$, is produced according to the relation $$KZ_{Rn} = \frac{1}{N} \sum_{i=1}^{N} \frac{C \times V_{mini}}{V_{Rni}}$$

When an average value over N=16 loops is produced and with a constant C=1000, depending on the signal resolution, a short-time factor of $$KZ_{R1} = \frac{1}{16} \sum_{i=1}^{16} \frac{1000 \cdot V_{mini}}{V_{R1i}}$$

is achieved for wheel 1.

In this case, the short-time correction factor is always less than 1000, and the signal resolution is at 0.1%.

Subsequently, the short-time correction factor $KZ_{R1}$ and the long-time correction factor $LZ_{R1}$ of the respective wheel n=1 are compared in a comparator and differentiator 2, and the difference or deviation $D_{R1}$ of the short-time correction factor from the long-time correction factor of this wheel is determined. The signal representative of the deviation $D_{Rn}$ or $D_{R1}$ is assessed by way of a band-pass filter 3 or weighted as a function of the vehicle speed. In a medium speed range which is between 60 km/h and 120 km/h in the present case, the band-pass filter 3 allows the signal $D_{R1}$ representative of the deviation to pass in full extent, while a very great attenuation prevails below a bottom speed threshold which is at 20 km/h and above a top speed threshold of 200 km/h in the present example. In the embodiment shown, the signal attenuation decreases linearly in the range between 20 km/h and 60 km/h and increases linearly in the range between 120 km/h and 200 km/h. Of course, other band-pass characteristic values are also appropriate, depending on the respective vehicle.

The weighted deviation $D'_{Rn}$ or $D'_{R1}$ is processed further in a second digital low-pass filter 4 (TP2). A long-time average value ($LM_{Rn}$ or $LM_{R1}$) is produced according to the relation $$LM_{Rn} = \frac{1}{M} \sum_{i=1}^{M} f(D'_{Rn})_i$$

In the present embodiment, a long-time average value $LM_{Rn}$ is produced in intervals of approximately 14 seconds, i.e. 128×16 loops, meaning 128×16×7 millisecs.

This way, the influencing variables of city traffic, such as acceleration maneuvers, narrow curves, etc., are filtered off in the lower speed range. The effects of high traction torques and engine stall torques are reduced to the correction factors in the high speed range.

However, only a partial value $TW_{Rn}$ or $TW_{R1}$ of the long-time average value $LM_{Rn}$ or $LM_{R1}$ is conducted and processed further in the method of the present invention. The partial values are determined as a function of curve weighting factors Gk which, in turn, are achieved by diagonal, sidewise and axlewise comparison of the long-time average values of the individual wheels. In the predefined periods, i.e. every 14 seconds, the long-time average values $LM_{Rn}$ are compared, and a corresponding curve weighting factor Gk is calculated in the following manner:

a) diagonal comparison:

$|LM_{R1}+LM_{R3}-LM_{R2}-LM_{R4}| >= 20(=2\%)$

Gk equals 1 is assumed in this case.

b) When condition a) is not satisfied, there is the assumption of circular-course driving or cornering. The long-time average values of the individual wheels are compared sidewise, and the curve weighting factors in this case are defined according to the following pattern:

$|LM_{R1}+LM_{R4}-LM_{R2}-LM_{R3}| > 10(=1\%) Gk=2$ $|LM_{R1}+LM_{R4}-LM_{R2}-LM_{R3}| > 20(=2\%) Gk=3$ $|LM_{R1}+LM_{R4}-LM_{R2}-LM_{R3}| > 30(=3\%) Gk=4$ $|LM_{R1}+LM_{R4}-LM_{R2}-LM_{R3}| > 40(=4\%) Gk=5$ etc.

The index "1" refers to the left front wheel, and the index "2" refers to the right front wheel. The reference numerals "3" und "4" designate the right and the left rear wheels.

c) The influence of engine stall torques may be identified by axlewise comparison of the long-time average values. To this end, the long-time average values are compared axlewise:

$|LM_{R1}+LM_{R2}-LM_{R3}-LM_{R4}| > 10(=1\%) Gk2$

The curve weighting factor Gk is multiplied by 2 in this case.

Adopting the output signal of the attenuating circuit 5 is limited to the long-time correction factor $LZ_{Rn}$ or $LZ_{R1}$ individually for each wheel in a subsequent band-pass filter 6. To weaken the effect of overspinning of a wheel on the long-time correction factor, the partial value $TW_{R1}=LM_{R1}/Gk$ (provided this value ranges between 0 and 10%) is adopted in full. The partial value is limited to 10% when it ranges between 10 and 20%, and the partial value is adopted 10% to zero % when it is between 20 and 30%. The course of curve indicative of the adoption is shown symbolically in the band-pass filter block 6.

The output signal of the band-pass filter 6 is evaluated in an adapting circuit 7 for the correction of the long-time correction factor $LZ_{Rn}$ or $LZ_{R1}$ which, finally, is returned from the output of the circuit 7 to the comparator and differentiator 2.

The long-time correction factor is produced for each wheel in the above-mentioned operation which applies to wheel 1 (n=1).

Finally, two switches are shown symbolically in the drawing. SW1 is open when disturbance of the input signals is detected.

SW2 is open when the long-time correction factor of the corresponding wheel is identified as "correct" and shall not be corrected for the time being. Switch SW2 is closed as soon as the filtered, averaged and weighted short-time correction factor, i.e. its partial value $TW_{Rn}$ ($TW_{R1}$ in the present case), exceeds a limit value. To this end, the partial value $TW_{R1}$ is ascertained by way of a counter 8 in the operating cycle of the low-pass filter 4 (TP2), i.e. in the 14-second cycle, in the present embodiment of the invention. The output signals are counted. In the absence of need for correction, the value of the output signal of step 5 amounts to "0" or "1". These values are added in the counter 8. When higher partial values $TW_{R1}$ occur, the values are deducted from the contents of the counter 8. As soon as the contents of the counter do not reach a predetermined value, switch SW2 is closed. This way, the desired correction is performed very quickly in the initial phase.

We claim:

1. Method of determining correction factors by which the differences of a tire-tread cirumference are determined in the evaluation of wheel speed signals, which are input signals for an automotive vehicle control system, wherein, in the absence of control operations, the wheel speeds are measured, a reference speed is determined and the wheel speed is compared to the reference speed for producing the correction factors, characterized in that a short-time correction factor $KZ_{Rn}$ and a long-time correction factor $LZ_{Rn}$ is developed for each wheel n; n=1 to 4, the deviation $D_{Rn}$ of the short-time correction factor from the long-time correction factor is determined, this deviation $D_{Rn}$ is weighted by way of a band-pass filter which weakens the signal representative of the deviation $D_{Rn}$ below a bottom speed threshold and above a top speed threshold, a long-time average value $LM_{Rn}$ of the weighted deviation $D_{Rn}$ is produced by way of a low-pass filter, and a partial value $TW_{Rn}$ of the long-time average value $LM_{Rn}$ is assessed, as a function of the driving condition, for the correction or adaption of the long-time correction factor $LZ_{Rn}$.

2. Method as claimed in claim 1, characterized in that the wheel having the lowest wheel speed $v_{min}$ is taken as the reference speed, and in that the short-time correction factor $KZ_{Rn}$ of the respective wheel n is developed by division of the reference speed $v_{min}$ by the wheel speed $v_{Rn}$ and by producing the average value or filtering the quotient $v_{min}/v_{Rn}$.

3. Method as claimed in claim 2, characterized in that, for producing the average value, a digital filter or a low-pass filter is used which develops the short-time correction factor $KZ_{Rn}$ according to the relation and in the relation, $$KZ_{Rn} = \frac{1}{N} \sum_{i=1}^{N} \frac{C * v_{\text{min}\,i}}{v_{Rn\,i}}$$

$KZ_{Rn}$ is the short-time correction factor of the wheel n n=1 to 4,

N is the number of loops or cycles, by way of which the average value is produced, $v_{min}$ is the instantaneously lowest wheel speed, $v_{Rn}$ is the instantaneous speed of the wheel n, C is a constant, for example, C=1000.

4. Method as claimed in claim 3, characterized in that with a loop time in the order of 5 to 20 msecs, the average value is developed over a period of time in the order of 50 to 200 msecs.

5. Method as claimed in claim 1, characterized in that the long-time average $$LM_{Rn} = \frac{1}{M} \sum_{i=N}^{M*N} f(D'_{Rn})_i$$

values $LM_{Rn}$ of the weighted deviations $D'_{Rn}$ are produced according to the relation and, in the relation, $LM_{RN}$ is the long-time average value of the wheel n, is the average value of the weighted deviation $D'_{Rn}$ of the short-time correction factor from the long-time correction factor of the wheel n, M is the number of the summing intervals N.

6. Method as claimed in claim 1, characterized in that the partial values $TW_{Rn}$ are determined by curve-weighting factors Gk which are determined by a diagonal, sidewise and axlewise comparison of the long-time average values $LM_{Rn}$ of the individual wheels.

7. Method as claimed in claim 1, characterized in that the long-time correction factors $LZ_{Rn}$ are varied as a function of the partial values $TW_{Rn}$ and depending on the magnitude of the partial values.

8. Method of determining correction factors by which the differences of a tire-tread cirumference are determined in the evaluation of wheel speed signals, wherein the wheel speeds are measured, a reference speed is determined and the wheel speed is compared to the reference speed for producing the correction factors, wherein a short-time correction factor $KZ_{Rn}$ and a long-time correction factor $LZ_{Rn}$ is developed for each wheel n, the deviation $D_{Rn}$ of the short-time correction factor from the long-time correction factor is determined, this deviation $D_{Rn}$ is weighted by way of a filter which speed-dependently weakens the signal representing the deviation $D_{Rn}$, a long-time average value $LM_{Rn}$ of the weighted deviation $D_{Rn}$ is produced, and the long-time correction factor $LZ_{Rn}$ is corrected dependent on the long-time average value $LM_{Rn}$.

9. The method of claim 8 wherein the deviation $D_{Rn}$ of the short-time correction factor from the long-time correction factor is weighted by way of a band-pass filter which weakens the signal representative of the deviation $D_{Rn}$ below a bottom speed threshold and above a top speed threshold.

10. The method of claim 8 wherein the long-time average value $LM_{Rn}$ of the weighted deviation $D_{Rn}$ is produced by way of a low-pass filter.

11. Method of determining correction factors by which the differences of a tire-tread cirumference of tires of a vehicle are determined in the evaluation of wheel speed signals, wherein the wheel speeds are measured, a reference speed is determined and the wheel speed is compared to the reference speed for producing the correction factors, wherein a short-time correction factor $KZ_{Rn}$ and a long-time correction factor $LZ_{Rn}$ is developed for each wheel n, the deviation $D_{Rn}$ of the short-time correction factor from the long-time correction factor is determined, and the long-time correction factor $LZ_{Rn}$ is corrected dependent on a value derived by processing the deviation $D_{rn}$ over a certain time period.

* * * * *